United States Patent
Ishizu et al.

(10) Patent No.: US 8,877,113 B2
(45) Date of Patent: Nov. 4, 2014

(54) METHOD OF MOLDING CLIP MOUNT AND TRIM BOARD

(71) Applicant: Toyota Boshoku Kabushiki Kaisha, Aichi-ken (JP)

(72) Inventors: Yohei Ishizu, Aichi (JP); Junichi Okada, Aichi (JP); Hideaki Tanaka, Aichi (JP)

(73) Assignee: Toyota Boshoku Kabushiki Kaisha, Aichi-Ken (JP)

(*) Notice: Subject to any disclaimer, the term of this patent is extended or adjusted under 35 U.S.C. 154(b) by 0 days.

(21) Appl. No.: 13/864,436

(22) Filed: Apr. 17, 2013

(65) Prior Publication Data

US 2013/0305653 A1 Nov. 21, 2013

(30) Foreign Application Priority Data

May 21, 2012 (JP) ................ 2012-115504

(51) Int. Cl.
| | |
|---|---|
| *B29B 7/00* | (2006.01) |
| *B29C 45/00* | (2006.01) |
| *F16B 2/20* | (2006.01) |
| *B60R 13/02* | (2006.01) |
| *F16B 5/06* | (2006.01) |
| *B29C 45/14* | (2006.01) |
| *B29C 45/33* | (2006.01) |

(52) U.S. Cl.
CPC .............. *F16B 2/20* (2013.01); *B60R 13/0243* (2013.01); *F16B 5/0664* (2013.01); *B29C 45/1418* (2013.01); *B60R 13/0206* (2013.01); *B29C 2045/0093* (2013.01); *B29C 45/33* (2013.01); *B29C 45/14336* (2013.01)
USPC ..... 264/328.1; 264/337; 264/257; 264/271.1; 264/238; 264/318; 280/728.2; 293/155

(58) Field of Classification Search
USPC ........... 264/271.1, 337, 259, 238, 318, 328.1; 280/728.2; 293/155
See application file for complete search history.

(56) References Cited

U.S. PATENT DOCUMENTS

| | | | | |
|---|---|---|---|---|
| 3,928,894 | A * | 12/1975 | Bury et al. ..................... 248/467 |
| 4,579,755 | A * | 4/1986 | Takeda et al. ................... 428/31 |
| 6,824,281 | B2 * | 11/2004 | Schofield et al. ............. 359/876 |
| 7,105,119 | B2 * | 9/2006 | Kanie et al. ................... 264/238 |
| 7,166,350 | B2 * | 1/2007 | Murayama .................... 428/131 |
| 7,188,963 | B2 * | 3/2007 | Schofield et al. ............. 359/844 |
| 8,179,437 | B2 * | 5/2012 | Schofield et al. ............. 348/148 |
| 2002/0037389 | A1 * | 3/2002 | Miyano et al. .................. 428/99 |

FOREIGN PATENT DOCUMENTS

JP 2006-347128 12/2006

* cited by examiner

*Primary Examiner* — Chi Q Nguyen
(74) *Attorney, Agent, or Firm* — Greenblum & Bernstein, P.L.C.

(57) ABSTRACT

A method of molding a clip mount on a baseboard includes: forming a clip mount forming space with a die set including at least first slide die and second slide die; injecting molten resin into the space; forming a first wall; forming a connecting wall so as to extend from a distal end of the first wall such that a distance between the connecting wall and a surface of the baseboard increases as a distance from the first wall increases; forming a second wall; forming a mount wall so as to extend from an end of the second wall such that a distance between the mount wall and the connecting wall increases as a distance from the second wall increases; sliding the first slide die for removal; and sliding the second slide die in a different direction from a direction in which the first slide die is slid for removal.

7 Claims, 14 Drawing Sheets

METHOD OF MOLDING CLIP MOUNT AND TRIM BOARD

CROSS REFERENCE TO RELATED APPLICATION

This application claims priority from Japanese Patent Application No. 2012-115504 filed on May 21, 2012. The entire content of this priority application is incorporated herein by reference.

FIELD OF THE INVENTION

The present disclosure relates to a method of molding a clip mount and a trim board.

BACKGROUND OF THE INVENTION

It is known to mount a baseboard to a plate-shaped member with clips. A vehicular inner panel and a trim board are examples of a plate-like member and a baseboard, respectively. The trim board includes clip mounts (retainers) for holding clips. Each clip mount has a mount wall (or a vertical wall) to which a corresponding clip is mounted. The mount wall is arranged so as to face a mount surface of the inner panel, specifically, parallel to the mount surface of the inner panel. The clip mounts are molded by injection molding using dies.

The mount wall of the clip mount is a so-called undercut portion. Slide dies are used for molding the mount wall in a known method of molding the clip mount. In this method, the clip mount (or the mount wall) is formed by injection molding and the die between the mount wall and the baseboard is slid and removed therefrom. Because the die is not blocked by the mount wall, the baseboard can be removed from the dies.

A surface shape of the baseboard on which the clip mount is formed is important for removal of the die located between the mount wall and the baseboard. As illustrated in FIG. 14, if a distance L1 between opposed surfaces 2A and 3A of a mount wall 2 and a baseboard 3 decreases along a sliding direction (or a removal direction) of a slide die 4 indicated by arrow P1, the slide die 4 cannot be removed.

Namely, a surface of a baseboard needs to be formed such that a distance between opposed surfaces are constant or increases along a sliding direction of a slide die.

For forming the clip mount on the baseboard, the surface shape of the baseboard needs to be designed in consideration of the sliding direction (or the removal direction) of a slide die. The clip mount may need to be arranged in an area of the surface of the baseboard where a distance between opposed surfaces does not decrease toward which the slide die is slid for removal. Alternatively, the surface shape of the baseboard may need to be designed such that the distance does not decrease along the sliding direction for removal. These decrease flexibility in designing of the clip mount.

SUMMARY OF THE INVENTION

The invention described herein has been made in view of the aforementioned circumstances. An objective of the invention is to provide a method of molding a clip mount in a shape that is less affected by a surface shape of a baseboard and thereby increasing flexibility in designing of the clip mount.

A method of molding a clip mount on a baseboard is provided. The clip mount is for holding a clip with which the base board is attached to a plate-shaped member. The method includes forming a clip mount forming space with a first slide die including a projection, a second slide die including a projection, and a base die including a recess in which the first slide die and the second slide die are placed. The clip mount forming space includes a first portion, a second portion, a third portion, and a fourth portion. The first portion is defined by a first surface of the projection of the first slide die and a surface of the second slide die opposite the first surface of the projection of the first slide die. The second portion is defined by a second surface of the projection of the first slide die continuing from the first surface thereof and a first surface of the projection of the second slide die opposite the second surface of the projection of the first slide die. The third portion is defined by a second surface of the projection of the second slide die continuing from the first surface thereof and a first surface of the base die. The fourth portion is defined by a third surface of the projection of the second slide die continuing from the second surface thereof and a second surface of the base die continuing from the first surface of the base die. The method includes injecting molten resign into the clip mount forming space. The method includes forming a first perpendicular wall in the first portion of the clip mount forming space so as to rise from an opposed surface of the baseboard that is to be arranged opposite the plate-shaped member when attached to the plate-shaped member. The method includes forming a connecting wall in the second portion of the clip mount forming space so as to extend from a distal end of the first perpendicular wall away from the baseboard such that a distance between the connecting wall and the opposed surface of the baseboard is constant or increases as a distance from the first perpendicular wall increases. The method includes forming a second perpendicular wall in the third portion of the clip mount forming space so as to rise from a distal end of the connecting wall away from the first perpendicular wall toward an opposite direction to the baseboard. The method includes forming a mount wall with a mounting hole in the fourth portion of the clip mount forming space so as to extend from an end of the second perpendicular wall away from the connecting wall such that a distance between the mount wall and the connecting wall is constant or increases as a distance from the second perpendicular wall increases. The method includes sliding the first slide die for removal from the formed clip mount. The method includes sliding the second slide die in a different direction from a direction in which the first slide die is slid for removal from the formed clip mount.

BRIEF DESCRIPTION OF THE DRAWINGS

An example for carrying out the invention is shown in the drawing and is described in detail as follows.

DETAILED DESCRIPTION OF THE PREFERRED EMBODIMENTS

Figure 1:
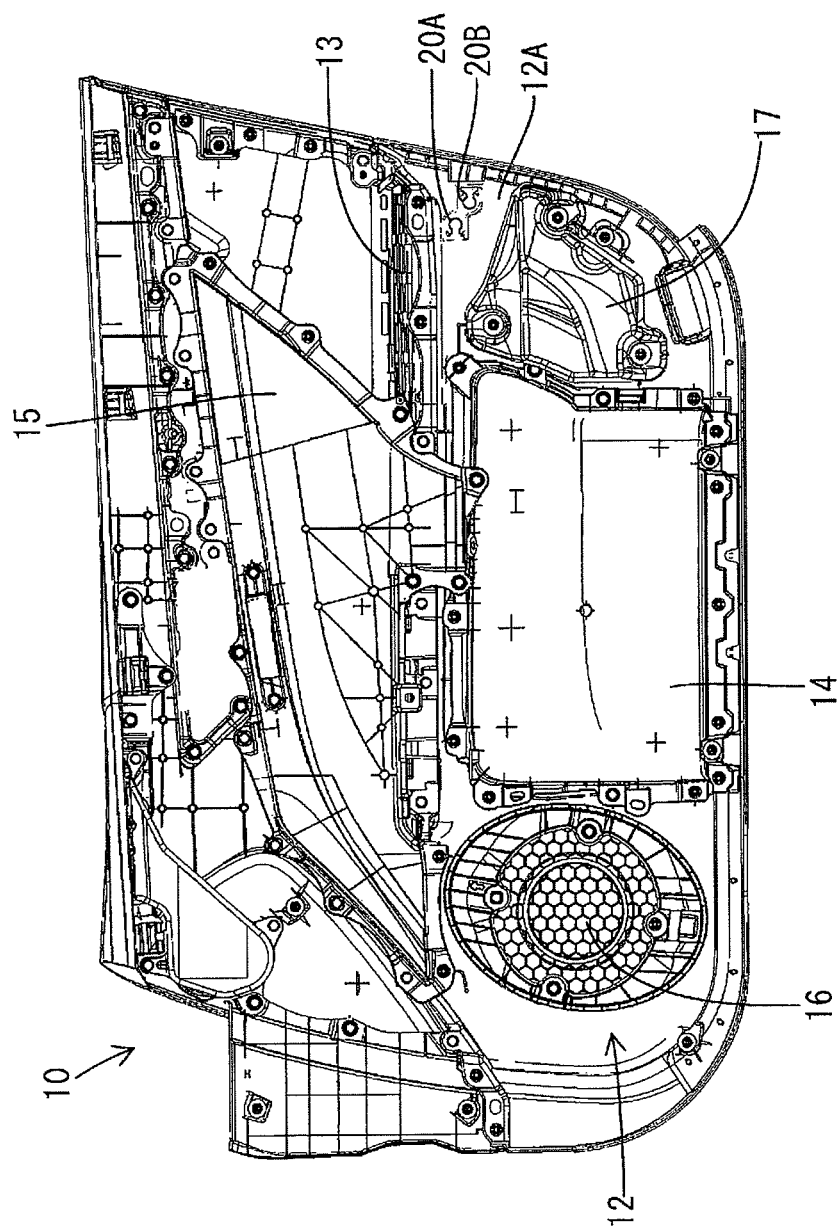
FIG. 1 shows a backside of a door trim.
Figure 12:
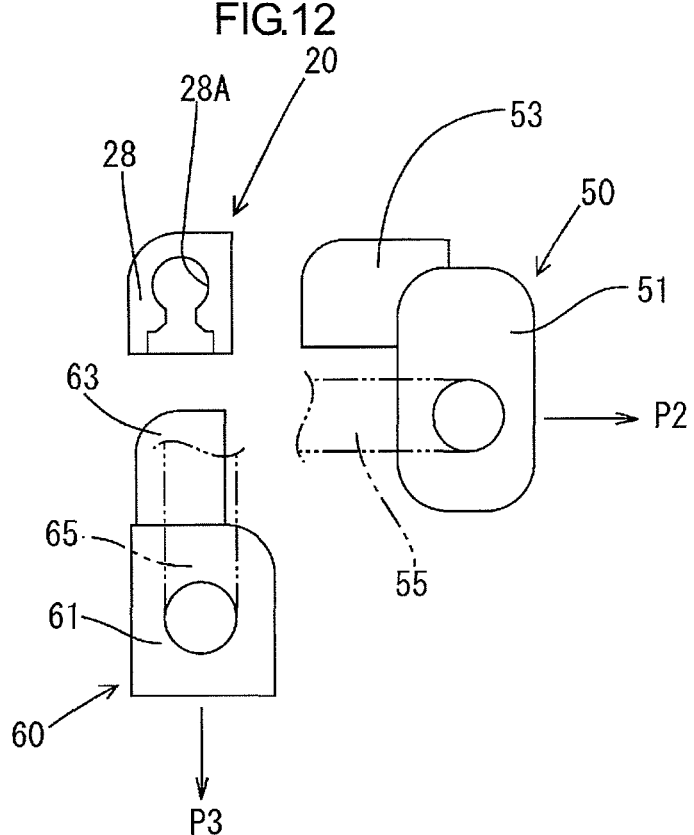
FIG. 12 shows a schematic view illustrating another embodiment.
Figure 13:
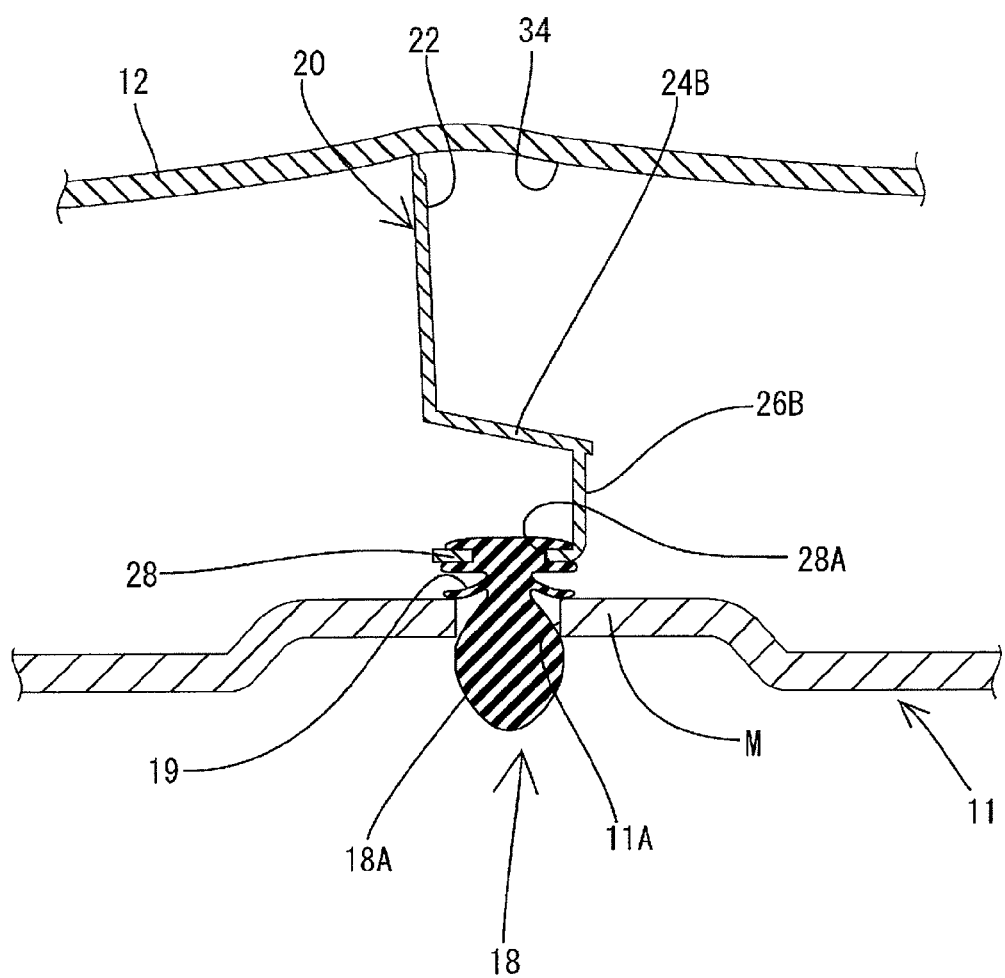
FIG. 13 shows a cross-sectional view illustrating the door trim attached to a door inner panel.
Figure 14:
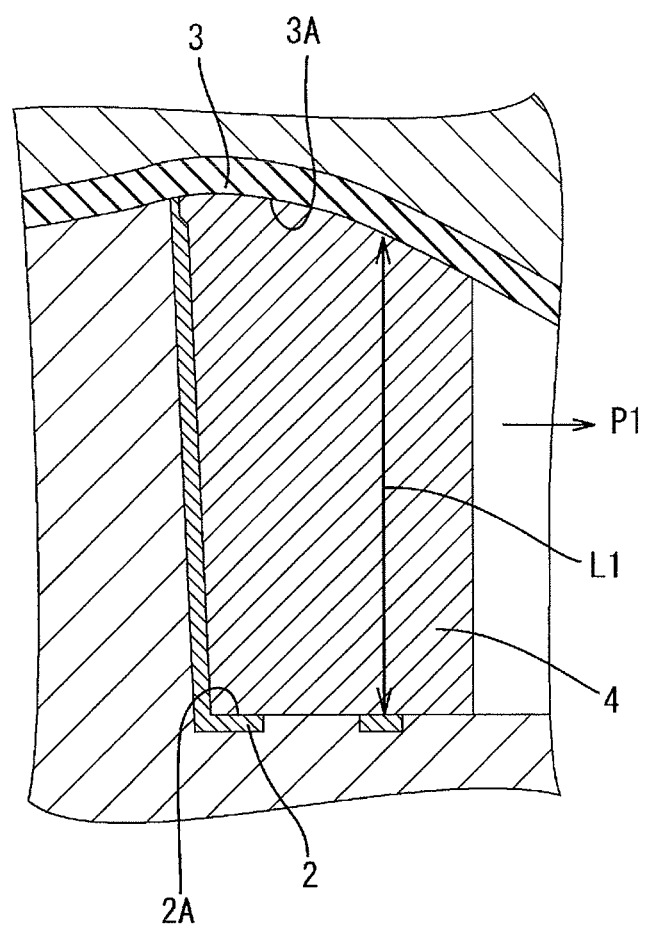
FIG. 14 shows a cross-sectional view illustrating a clip mount forming process according to a related art.

An embodiment will be explained with reference to FIGS. 1 to 13. As illustrated in FIG. 1, a vehicular door trim 10 includes clip mounts 20A and 20B on the rear surface thereof that is to be opposite an interior surface of a door inner panel 11 when mounted to the door inner panel 11 (a plate-shaped member) as shown in FIG. 13. The door trim 10 is a part of a vehicular door.

The door trim 10 includes a trim board 12 (a baseboard) and an ornament 15 mounted on the trim board 12. The trim board 12 is made of synthetic resin or mixed material of synthetic resin and natural fibers formed into a plate-like shape. The synthetic resin may be polypropylene and the natural fibers may be kenaf fibers. The material of the trim board 12 is not limited to those mentioned above and different material can be used as appropriate. The trim board 12 includes an armrest 13, a door pocket 14, a speaker grille, and an energy-absorption (EA) pad 17.

Each of the clip mounts 20A and 20B projects from an exterior surface 12A of the trim board 12 The exterior surface 12A is to be arranged opposite the inner surface of the door inner panel 11 to face toward the outside of the vehicle (an opposed surface to be opposite the plate-shaped member). The clip mounts 20A and 20B may be arranged in an edge area of the trim board 12 close to the edge of the trim board 12. In FIG. 1, the clip mounts 20A and 20B are arranged below the armrest 13.

Figure 2:
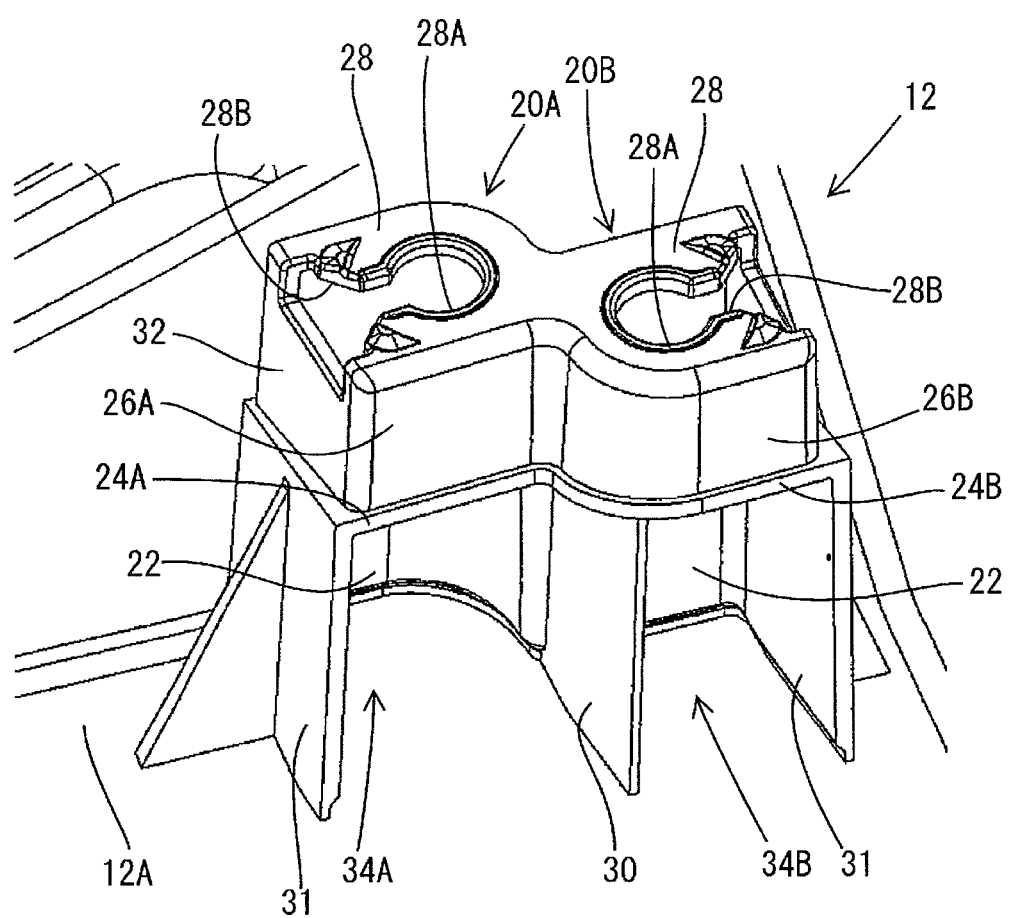
FIG. 2 shows a perspective view of a clip mount included in the door trim shown in FIG. 1.
Figure 3:
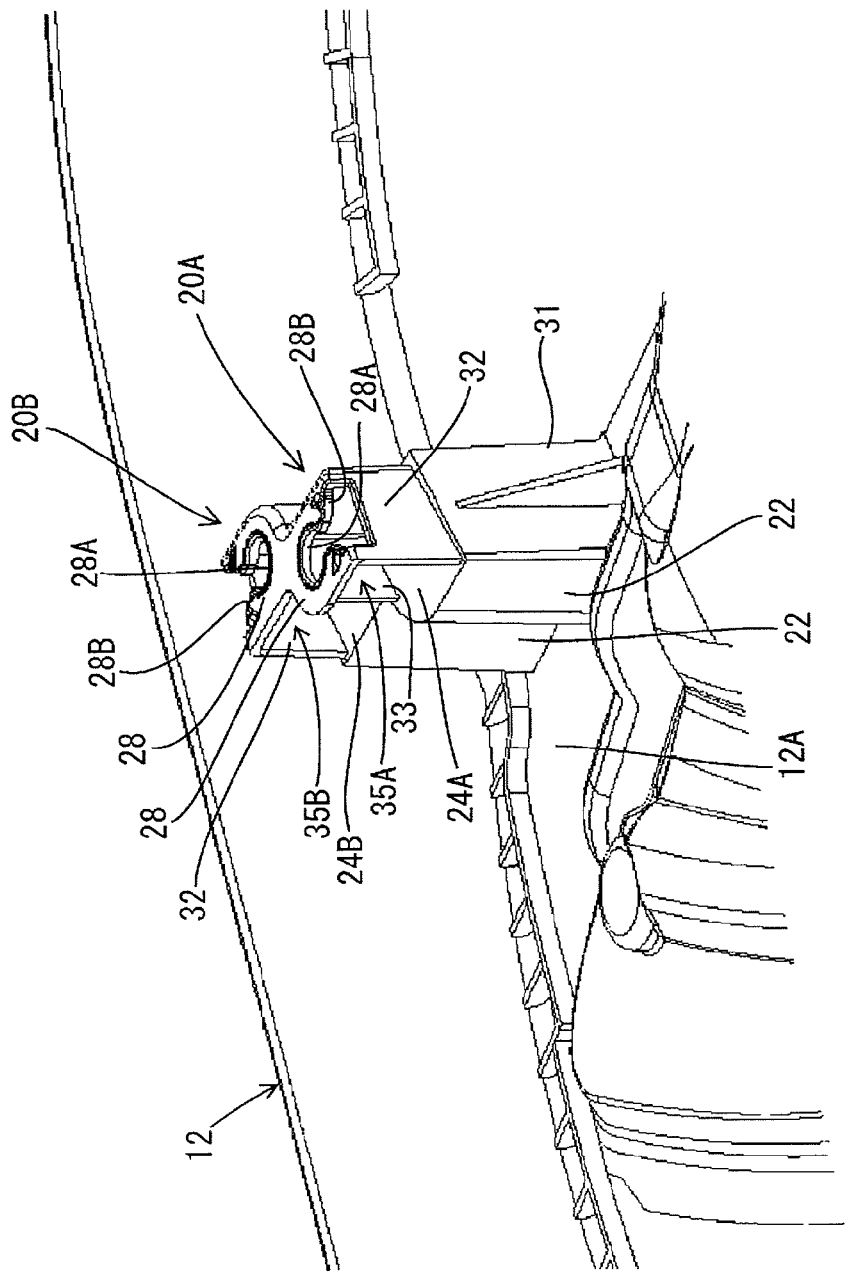
FIG. 3 shows a perspective view of the clip mount in FIG. 2.

As illustrated in FIGS. 2 and 3, two clip mounts 20A and 20B are joined together. As illustrated in FIG. 1, the clip mounts 20A and 20B are displaced from each other in the vertical (the top-bottom direction of the vehicle) and horizontal direction (the front-rear direction of the vehicle) on the trim board 12 that is in a vertical position. The clip mounts 20A and 20B have point-symmetric plan view shapes in FIG. 1. In the following description, the clip mount 20B closer to the edge of the trim board 12 will be described in detail. The other clip mount 20A has a similar configuration to the clip mount 20B. In the drawings, the reference symbols followed by letter A indicate the similar parts to those of the clip mount 20B indicated by the same reference numbers. Because the clip mount 20A has the similar configuration and is formed in the similar manner to the clip mount 20B, the clip mount 20A will not be described in detail.

Figure 8:
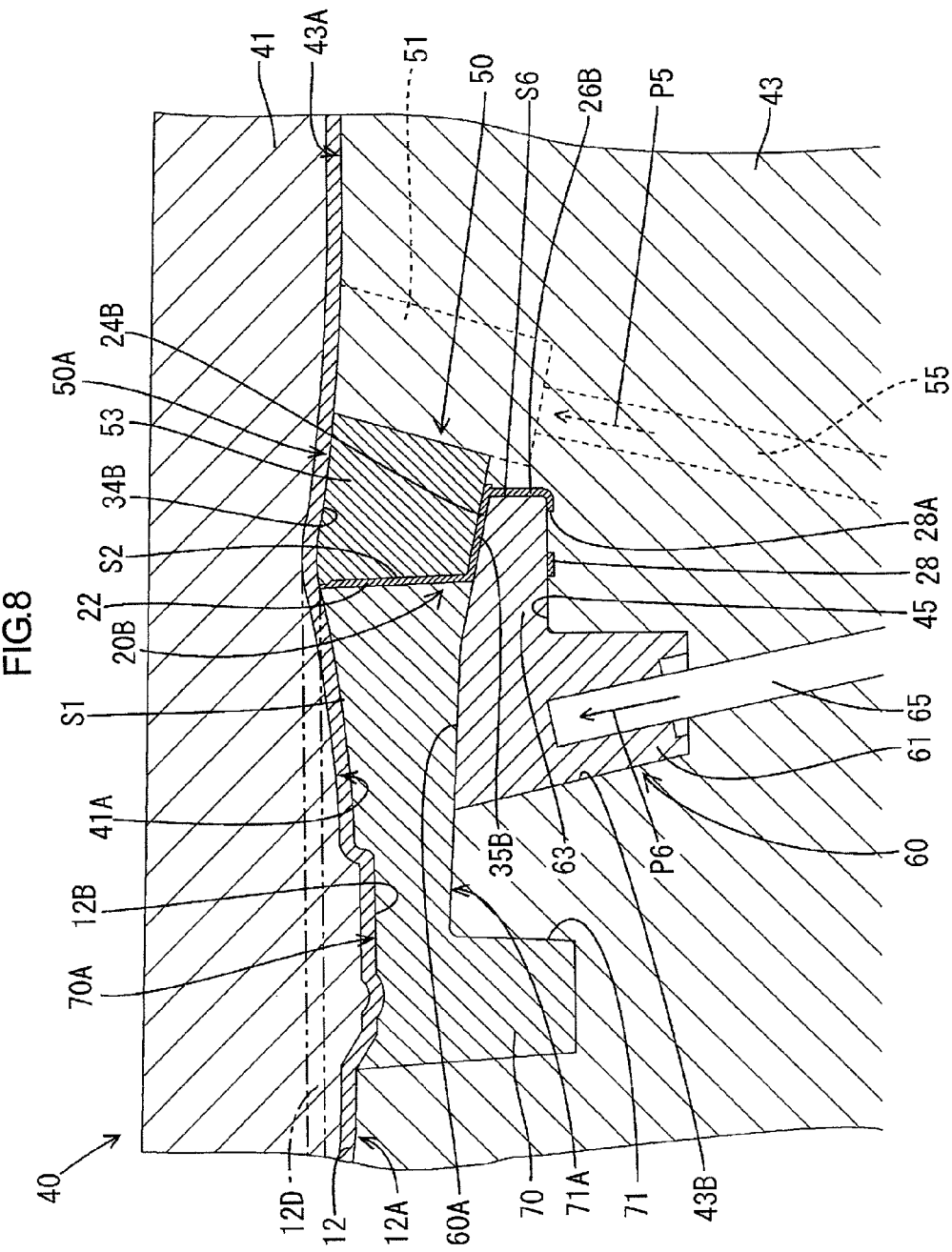
FIG. 8 shows a cross-sectional view cut along line A-A in FIGS. 6 and 7 illustrating the clip mount forming process.

The clip mount 20B is made of polypropylene, which is a thermoplastic resin. As illustrated in FIGS. 8 and 13, the clip mount 20B includes a first perpendicular wall 22, a second perpendicular wall 26B, a connecting wall 24B, and a mount wall 28. The first perpendicular wall 22 rises from the exterior surface 12A (so as to be toward the door inner panel 11). The connecting wall 24B extends from a distal end of the first perpendicular wall 22 (an end away from the baseboard) the views of FIGS. 8 and 13. The second perpendicular wall 26B rises from a distal end of the connecting wall 24B (so as to be toward the door inner panel 11). The second perpendicular wall 26B is perpendicular or substantially perpendicular to the exterior surface 12A so as not to face the first perpendicular wall 22. The connecting wall 24B is connected between the distal end of the first perpendicular wall 22 away from the exterior surface 12A and an end of the second perpendicular wall 26B close to the exterior surface 12A. The mount wall 28 extends from a distal end of the second perpendicular wall 26B (an end away from the connecting wall) in the views of FIGS. 8 and 13.

As illustrated in FIG. 8, the connecting wall 24B is arranged opposite the exterior surface 12A on the vehicle exterior side. Namely, the connecting wall 24 extends along the exterior surface 12A.

The mount wall 28 is formed in a plate-like shape and arranged opposite the connecting wall 24. The mount wall 28 has a mounting hole 28A that is a through hole in which a shaft of the clip 18 located closer to an interior end of the clip 18 on the vehicle interior side is inserted (see FIG. 13). As illustrated in FIG. 2, the mount wall 28 has an insertion hole 28B that is provided by cutting a part of the mount wall 28 at a part of an edge of the mounting hole 28A. The insertion hole 28B is for insertion of the clip 18 into the mounting hole 28A.

As illustrated in FIG. 13, flanges of the clip 18 provided at the interior end are held to the inner surface and the outer surface of the mount wall 28, respectively, when the shaft of the interior end of the clip 18 is inserted in the mounting hole 28A. As a result, the clip 18 is held so as not to move in a direction perpendicular to a direction in which the mount wall 28 extends.

A part of the clip 18 located on the vehicular exterior side is configured as a flexible portion 18A that is elastically deformable. The flexible portion 18A shrinks in diameter while it passes through a mounting hole 11A of the door inner panel 11. When a part of the flexible portion 18A passes through the mounting hole 11A and restores its shape with the resilience thereof, the flexible portion 18A is held against the edge of the mounting hole 11A from the vehicle exterior side.

With the clip 18 held in the clip mount 20B, the trim board 12 can be fixed to the door inner panel 11. The clip 18 includes a flap 19 that closes a gap between the inner wall of the mounting hole 11A and the flexible portion 18A.

As illustrated in FIG. 13, the mount wall 28 is arranged opposite a mounting surface M of the door inner panel 11 in which the mounting hole 11A is formed. The mount wall 28 is arranged along the mounting surface M. More specifically, the outer surface of the mount wall 28 opposite the mounting surface M is substantially parallel to the mounting surface M. The mounting hole 28A of the mount wall 28 and the mounting hole 11A of the door inner panel 11 are coaxially arranged. With this configuration, the trim board 12 can be properly fixed to the door inner panel 11 with the clip 18.

As illustrated in FIG. 2, the clip mount 20B includes a dividing wall 30 (a sidewall), a first sidewall 31, and a second sidewall 32. The dividing wall 30 and the first sidewall 31 are arranged on opposite sides of the first perpendicular wall 22 so as to be opposite to each other and connected with the respective sides of the trim board 12 and the connecting wall 24B. The second sidewall 32 is connected with the mount wall 28 and the connecting wall 24B.

The clip mounts 20A and 20B are arranged in the point symmetric manner as illustrated in FIG. 2. Therefore, the first sidewalls 31 are opposite to each other and the second sidewalls 32 are opposite to each other.

As described earlier, two clip mounts 20A and 20B are joined together in this embodiment. The dividing wall 30 is arranged between the clip mounts 20A and 20B so as to divide lower space of the clip mounts 20A and 20B (hollow portions 34A and 34B described later).

The clip mount 20B is formed by injection molding. The trim board 12 is prepared by pressing and placed in a die set 40. Then, molten resin is injected on the trim board 12 and the clip mount 20B is formed on the trim board 12. Namely, forming of the clip mount 20B and joining of the clip mount 20B to the trim board 12 are performed at the same time. As a result, the first perpendicular wall continuing from the portion of the exterior surface 12A of the trim board 12 is provided so as to rise from the exterior surface 12A in a direction perpendicular or substantially perpendicular to the exterior surface 12A.

The die set 40 for molding the clip mounts 20 on the trim board 12 will be described. As illustrated in FIG. 8, the die set 40 includes an upper die 41 (another base die) and a lower die 43 (a base die), a first slide die 50, a second slide die 60, and a core die 70 for injection molding.

The upper die 41 is a movable die that can be moved by a driving device, such as an electric motor, an air cylinder, and a hydraulic cylinder, while the lower die 43 remains fixed. Namely, the lower die 43 is a fixed die. By moving the upper die 41 toward or away from the lower die 43, the upper die 41 and the lower die 43 are closed or open.

As illustrated in FIG. 8, the lower die 43 is arranged opposite the upper die 41 such that space is provided therebetween when the dies 41 and 43 are closed. A distance between the upper die 41 and the lower die 43 corresponds to the thickness of the trim board 12. Namely, a baseboard shaping cavity S1 that is for shaping the trim board 12 is formed by the upper die 41, the lower die 43, the first slide die 50, and the core die 70. A board before pressing (a pre-board) is placed in the baseboard shaping cavity S1 and pressed. The pre-board is pressed into a shape corresponding to the shape of the baseboard shaping cavity S1. As a result, the trim board 12 is prepared.

An opposed surface 41A of the upper die 41 opposite the lower die 43, the first slide die 50, and the core die 70 is shaped to correspond to a design surface of the trim board 12. As illustrated in FIG. 8, a portion of the trim board 12 on which the clip mounts 20 are formed slightly projects upward (toward the interior of the vehicle when the trim board 12 is installed in the vehicle). Namely, the exterior surface 12A has a concaved portion in which a concave is provided. The surface of the portion of the trim board 12 gradually rises toward the joint between the trim board 12 and the clip mount 20B. The opposed surface 41A of the upper die 41 includes a recessed portion that is recessed upward. The recessed portion corresponds to the portion of the trim board 12 on which the clip mount 20B is formed.

An opposed surface 43A of the lower die 43, an opposed surface 50A of the first slide die 50, and an opposed surface 70A of the core die 70 opposite the opposed surface 41A of the upper die 41 are shaped to correspond to the exterior surface 12A of the trim board 12 (a backside, an opposite surface from the design surface). The lower die 43 has a recess 43B that opens upward. The first slide die 50, the second slide die 60, and the core die 70 are placed in the recess 43B.

As illustrated in FIG. 8, the first slide die 50 and the core die 70 are arranged opposite the opposed surface 41A of the upper die 41. The core die 70 is arranged between the upper die 41 and the second slide die 60. The opposed surface 70A of the core die 70 opposite the upper die 41 forms a part of the baseboard shaping cavity S1.

Figure 4:
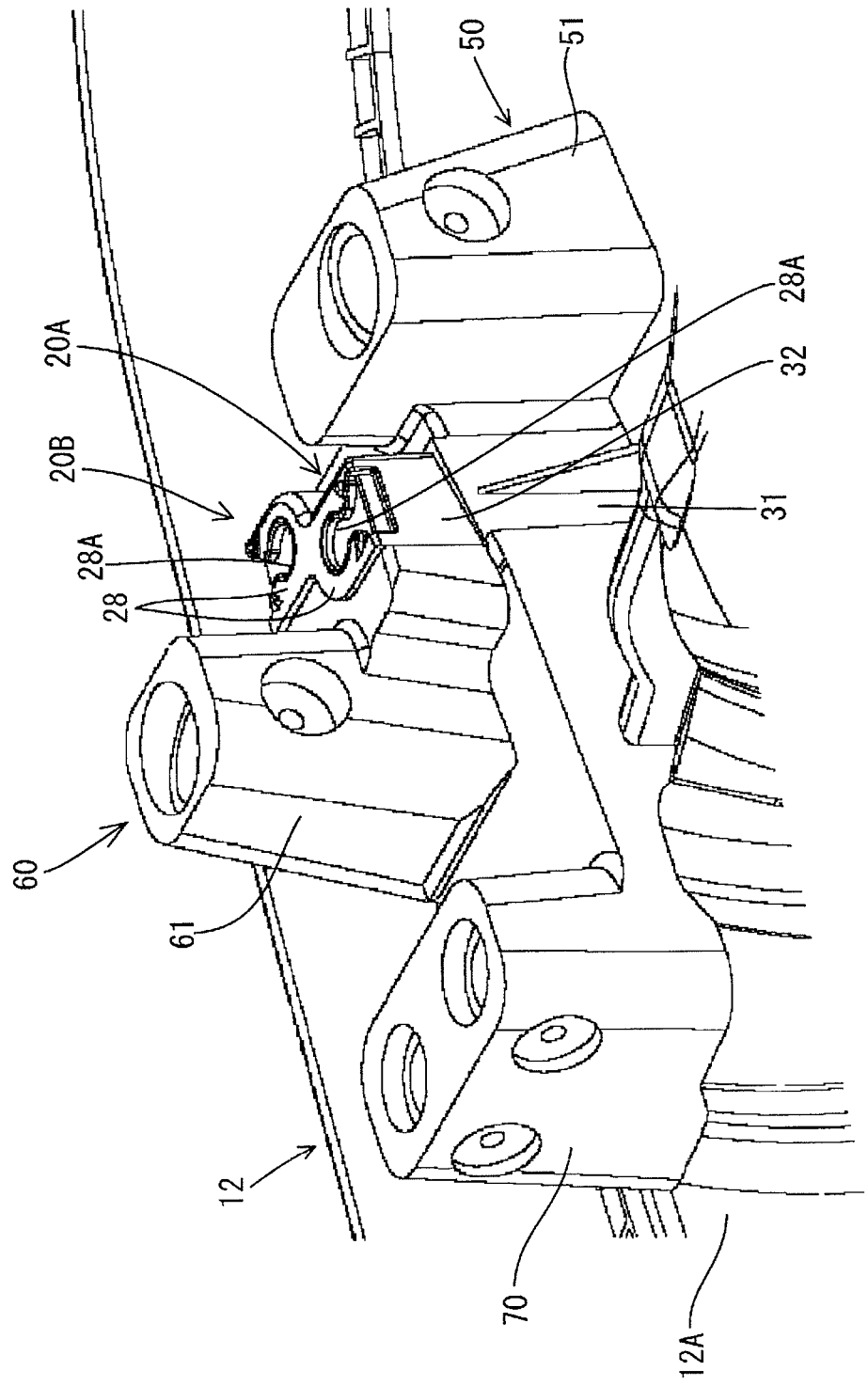
FIG. 4 shows a perspective view illustrating a clip mount forming process.
Figure 9:
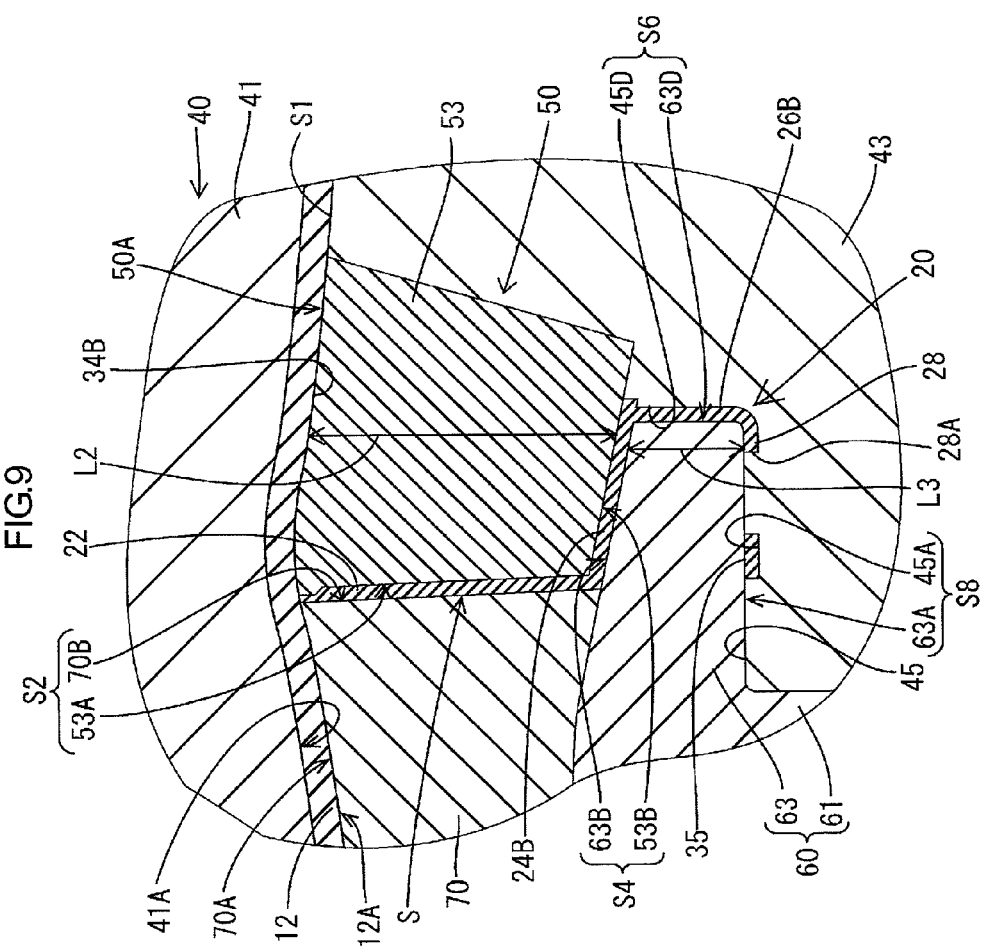
FIG. 9 shows a magnified view of the clip mount and therearound of FIG. 8.

As illustrated in FIGS. 4 and 8, the first slide die 50 is arranged horizontally adjacent to the core die 70. As illustrated in FIG. 9, the opposed surface 50A of the first slide die 50 opposite the upper die 41 forms a part of the baseboard shaping cavity S1. FIGS. 4 to 7 are bottom or bottom-up views of the die set 40 without the lower die 43.

Figure 5:
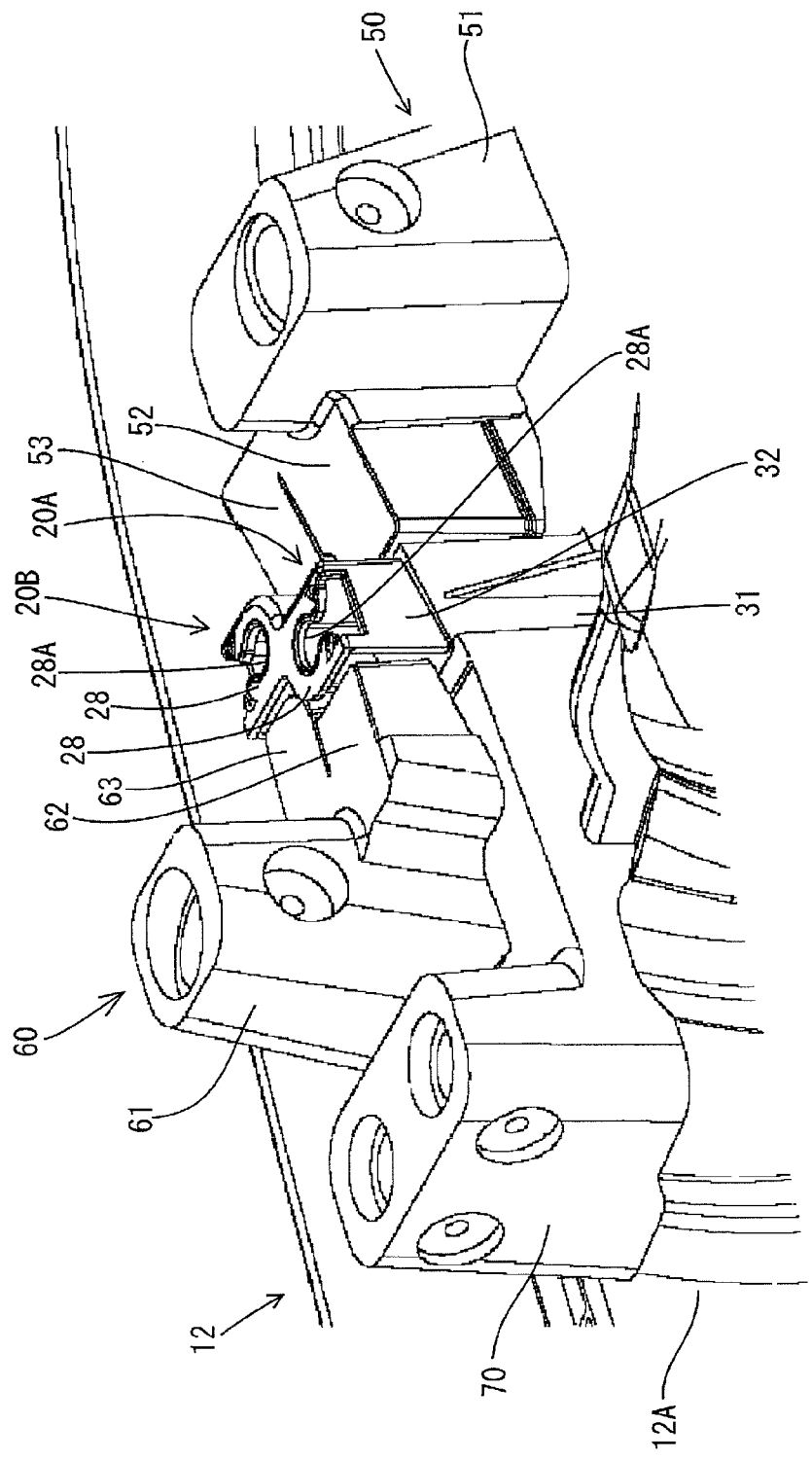
FIG. 5 shows a perspective view illustrating a first die removal process and a second die removal process.

As illustrated in FIGS. 5 and 8, the first slide die 50 includes a main portion 51 and projections 52 and 53 that project from the main portion 51 toward the core die 70. The projections 52 and 53 are formed in shapes corresponding to a hollow portion 34A of the clip mount 20A and a hollow portion 34B of the clip mount 20B, respectively. The hollow portion 34A of the clip mount 20A is defined by the trim board 12, the first perpendicular wall 22, the connecting wall 24A, and the first sidewall 31, and the dividing wall 30 (see FIG. 2). The hollow portion 34B of the clip mount 20B is defined by the trim board 12, the first perpendicular wall 22, the connecting wall 24B, and the first sidewall 31, and the dividing wall 30 (see FIG. 2). Namely, the projections 52 and 53 are provided to form inner walls of the hollows portions 34A and 34B, respectively.

As illustrated in FIG. 9, a first perpendicular wall molding cavity S2 is defined by a first surface 53A of the projection 53 of the first slide die 50 and a side surface 70B of the core die 70 (a surface opposite the first surface 53A of the projection 53 of the first slide die 50). Namely, first perpendicular wall molding cavity S2 is a vertical hole. The first perpendicular wall molding cavity S2 is provided for molding the first perpendicular wall 22 of the clip mount 20B. Another cavity defined by the distal end surface of the projection 52 and the side surface 70B is provided for molding the first perpendicular wall 22 of the clip mount 20A.

As illustrated in FIG. 8, a rod 55 is attached to the main portion 51 of the first slide die 50. The rod 55 is tilted so as to gradually separate from the first perpendicular wall molding cavity S2 as becoming closer to the main portion 51. A base end of the rod 55 (an end opposite from an end connected to the main portion 51) is connected to a driving device, which is not illustrated. The rod 55 is moved in a longitudinal direction thereof, or a direction in which the rod 55 extends, by the driving device. As a result, the first slide die 50 moves in the longitudinal direction of the rod 55. The moving direction of the first slide die 50 in which the first slide die 50 moves along with the rod 55 is indicated by an arrow P5 in FIG. 8.

As illustrated in FIGS. 5 and 8, the second slide die 60 includes a main portion 61 locate adjacent to the core die 70 and a pair of projections 62 and 63 projecting from the main portion 61. The projection 62 and 63 of the second slide die 60 are arranged adjacent to the projections 52 and 53 of the first slide die 50 in the direction in which the die set 40 is closed. The projections 62 and 63 are formed in shapes corresponding to a hollow portion 35A of the clip mount 20A and a hollow portion 35B of the clip mount 20B, respectively. The hollow portion 35A of the clip mount 20A is defined by the connecting wall 24A, the dividing wall 33, and the mount wall 28 (see FIGS. 2 and 3). The hollow portion 35B of the clip mount 20B is defined by the connecting wall 24B, the dividing wall 33, and the mount wall 28 (see FIGS. 2 and 3). Namely, the projections 62 and 63 are provided to form inner walls of the hollows portions 35A and 35B, respectively.

As illustrated in FIG. 9, a space is defined by the second surface 53B of the projection 53 of the first slide die 50 and the first surface 63B of the projection 63 of the second slide die 60. The second surface 53B of the projection 53 continues from the first surface 53A thereof. The first surface 63B of the projection 63 is opposite the second surface 53B of the projection 53. The space is a connecting wall molding cavity S4 for molding the connecting wall 24B of the clip mount 20B. Another cavity defined by the lower surface of the projection 52 and the lower surface of the projection 62 is provided for molding the connecting wall 24A of the clip mount 20A.

The lower die 43 includes a step portion 45 in the recess 43B. The projection 63 of the second slide die 60 fitted in the step portion 45. As illustrated in FIG. 9, a second perpendicular wall molding cavity S6 is defined by a sidewall 45D of the step portion 45 (a first surface of the base die) and a second surface 63D of the projection 63. The second surface 63D of the projection 63 continues from the first surface 63B thereof. The second perpendicular wall molding cavity S6 is provided for molding the second perpendicular wall 26B of the clip mount 20B. Another second perpendicular wall mounding cavity is provided for molding the second perpendicular wall 26A of the clip mount 20A.

As illustrated in FIG. 9, the lower die 43 includes a recess 45A in the upper surface of the step portion 45. The recess 45A is formed in a shape corresponding to the shape of the mount wall 28. A mount wall molding cavity S8 is defined by the inner wall of the recess 45A (a second surface of the base die) and the third surface 63A of the projection 63. The inner wall of the recess 45A continues from the sidewall 45D of thereof. The third surface 63A of the projection 63 continues from the second surface 63D thereof. The mount wall molding cavity S8 is provided for molding the mount wall 28 of the clip mount 20B. Another mount wall molding cavity is provided for molding the mount wall 28 of the clip mount 20A.

A rod 65 is attached to the main portion 61 of the second slide die 60. The rod 65 is tilted so as to gradually separate from the second perpendicular wall molding cavity S6 as becoming closer to the main portion 61. A base end of the rod 65 (an end opposite from an end connected to the main portion 61) is connected to a driving device, which is not illustrated.

The rod 65 is moved in a longitudinal direction thereof, or a direction in which the rod 65 extends, by the driving device. As a result, the second slide die 60 moves in the longitudinal direction of the rod 65. The moving direction of the second slide die 60 in which the second slide die 60 moves along with the rod 65 is indicated by an arrow P6 in FIG. 8. The core die 70 includes a step portion 71 in the lower surface thereof. The second slide die 60 can be fitted in the step portion 71. The core die 70 can be moved in the vertical direction in FIG. 8 by a driving device, which is not illustrated. The core die 70 moves up along with the upward movement of the second slide die 60.

The first perpendicular wall molding cavity S2, the connecting wall molding cavity S4, the second perpendicular wall molding cavity S6, and the mount wall molding cavity S8 defined by the first slide die 50, the second slide die 60, the core die 70, and the lower die 43 form a clip mount molding space S (see FIG. 9). The first perpendicular wall molding cavity S2 of the clip mount molding space S is communicated with the baseboard shaping cavity S1. The clip mount molding space S is an example of a clip mount forming space. The first perpendicular wall molding cavity S2, the connecting wall molding cavity S4, the second perpendicular wall molding cavity S6, and the mount wall molding cavity S8 are examples of a first portion, a second portion, a third portion, and a fourth portion of the clip mount forming space, respectively. The lower die 43 includes an injection device (not illustrated) configured to inject melted resin into the clip mount molding space S.

Next, a method of molding the clip mounts 20A and 20B with the die set 40 will be described with reference to FIGS. 4 to 10. The method includes a clip mount forming process, a first die removal process, and a second die removal process. In the clip mount forming process, the clip mounts 20A and 20B are formed on the trim board 12. The first die removal process and the second die removal process are performed after the clip mount forming process.

Prior to the clip mount forming process, a baseboard shaping process is performed for shaping the pre-board (not illustrated) into the trim board 12. In the baseboard shaping process, the pre-board is first heated to soften synthetic resin material (e.g., thermoplastic resin) included in the pre-board. Then, the pre-board is placed between the upper die 40 and lower die 43 in which the first slide die 50 and the core die 70 are fitted. When the upper die 41 and the lower die 43 are closed, the pre-board is pressed into the shape of the baseboard shaping cavity S1. When this process completes, the trim board 12 is prepared.

Clip Mount Forming Process

In the clip mount forming process, the melted resin is injected into the clip mount molding space S defined by the first slide die 50, the second slide die 60, the core die 70, and the lower die 43 while the trim board 12 is held by the upper die 41 and the lower die 43.

The melted resin injected into the clip mount molding space S is fused with the trim board 12. As a result, the clip mounts 20A and 20B are joined with the trim board 12 (see FIGS. 8 and 9), and the trim board 12 and the clip mounts 20A and 20B are provided as a single part. The clip mounts 20A and 20B are connected with the portion of the exterior surface 12A of the trim board 12 in which the concave is provided.

As illustrated in FIG. 9, the projections 52 and 53 of the first slide die 50 remain in the hollow portions 34A and 34B, respectively, immediately after the clip mounts 20A and 20B are formed. Furthermore, the projections 62 and 63 of the second slide die 60 remain in the hollow portions 35A and 35B, respectively. The hollow portion 34A and the hollow portion 35A are formed such that they open in opposite directions. The hollow portion 34B and the hollow portion 35B are formed such that they open in opposite directions. In FIG. 9, the hollow portion 34B opens toward the right and the hollow portion 35B opens toward the left.

As illustrated in FIG. 9, the connecting wall 24B is formed substantially parallel to the trim board 12. Namely, a distance L2 between opposed surfaces of the trim board 12 and the connecting wall 24B does not vary for the entire space of the hollow portion 34B between the second perpendicular wall 22 and the opening of the hollow portion 34B (in a direction in which the first slide die 50 is slid for removal). The connecting wall 24A is formed in the same manner as the connecting wall 24B.

The mount wall 28 of the clip mount 20B is formed such that a distance L3 between opposed surfaces of the connecting wall 24B and the mount wall 28 increases toward the opening of the hollow portion 35B (in a direction in which the second slide die 60 is slid for removal). The mount wall 28 of the clip mount 20A is formed in the same manner as the mount wall 28 of the clip mount 20B.

After the upper die 41 is moved upward to open the upper die 41 and the lower die 43, the first slide die 50, the second slide die 60, and the core die 70 are moved by the respective driving devices. At the same time, the trim board 12 is pushed upward by a lifting pin, which is not illustrated, in the opposite direction to the lower die 43.

The first slide die 50 moves in the direction opposite to the first perpendicular walls 22 (in the direction toward which the hollow portions 34A and 34B open, or to the right in FIG. 9) as moving upward. As the first slide die 50 slides in the direction toward which the hollow portions 34A and 34B open, the projections 52 and 53 are removed from the hollow portions 34A and 34B, respectively (the first die removal process).

The second slide die 60 moves in the direction opposite to the second perpendicular walls 26A and 26B (in the direction toward which the hollow portions 35A and 35B open, or to the left in FIG. 9) as moving upward. As the second slide die 60 slides in the direction toward which the hollow portions 35A and 35B open, the projections 62 and 63 are removed from the hollow portions 35A and 35B, respectively (the second die removal process). In the second die removal process, the second slide die 60 slides on the opposed surface 71A of the core die 70 located on the second slide die 60 side. The opposed surface 71A is a slide surface.

Figure 6:
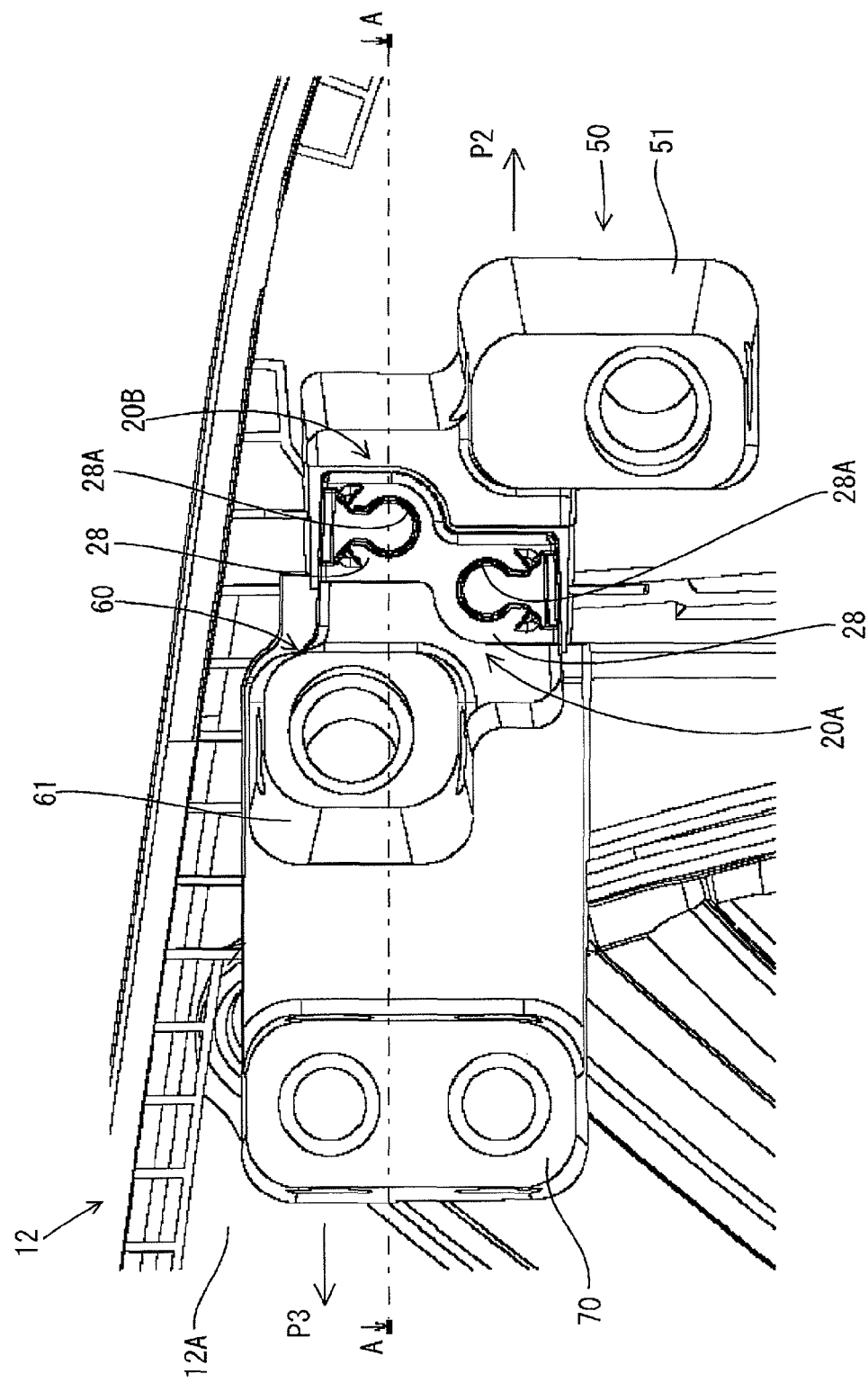
FIG. 6 shows a plan view illustrating the clip mount forming process.
Figure 7:
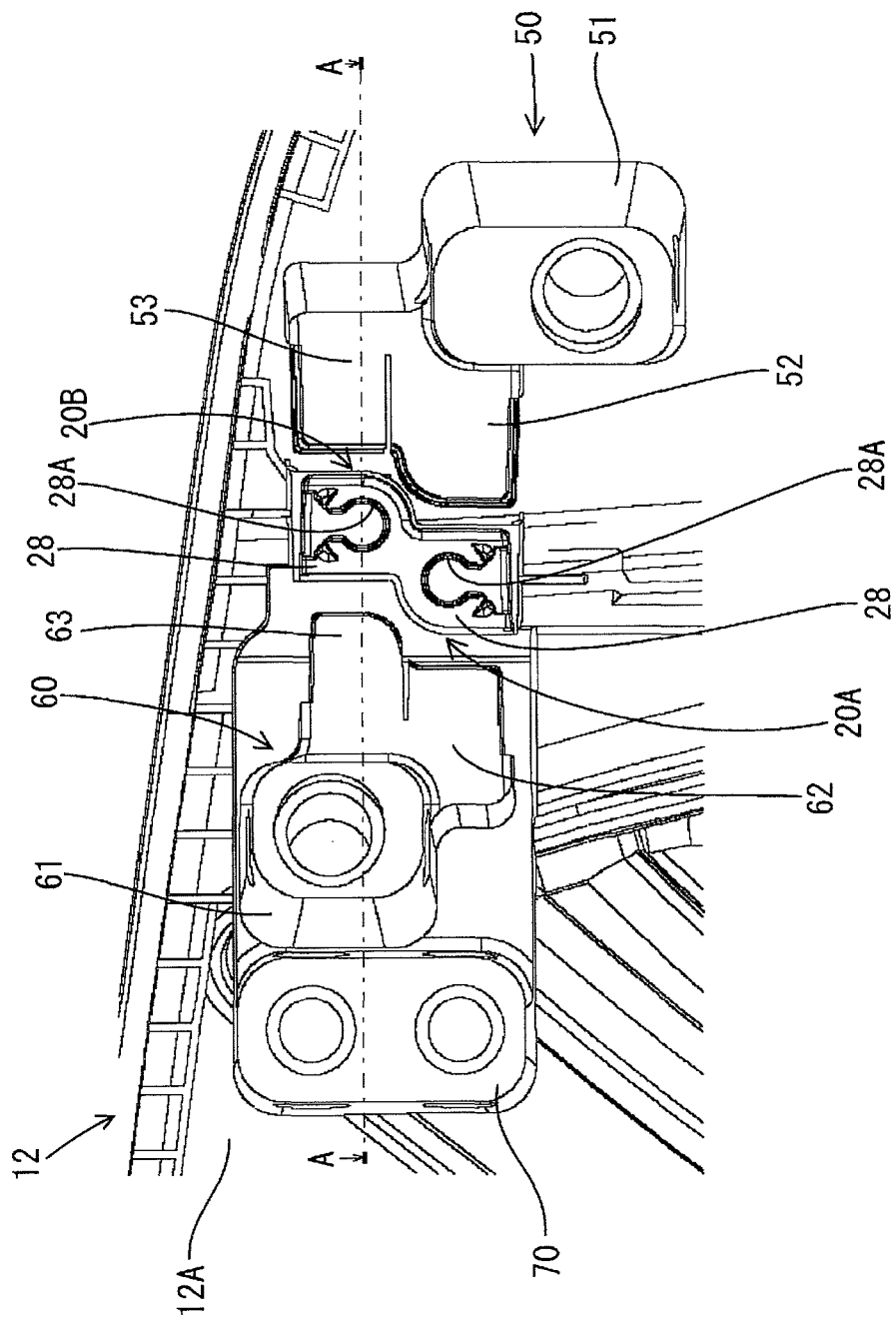
FIG. 7 shows a plan view illustrating the first die removal process and the second die removal process.

A sliding direction P2 (or a removal direction) of the first slide die 50 that slides in the first die removal process and a sliding direction P3 (or a removal direction) of the second slide die 60 that slides in the second die removal process are opposite to each other on the exterior surface 12A of the trim board 12 on the vehicle exterior side (on the horizontal surface or in plan view, see FIGS. 6 and 7).

The trim board 12 with the clip mounts 20A and 20B formed thereon prepared in the above processes is separated from the lower die 43. Moreover, the projections 52 and 53 are removed from the hollow portions 34A and 34B, respectively, and the projections 62 and 63 are removed from the hollow portions 35A and 35B, respectively (see FIGS. 5 and 7). As a result, the trim board 12 with the clip mounts 20A and 20B formed thereon can be removed from the die set 40.

Figure 10:
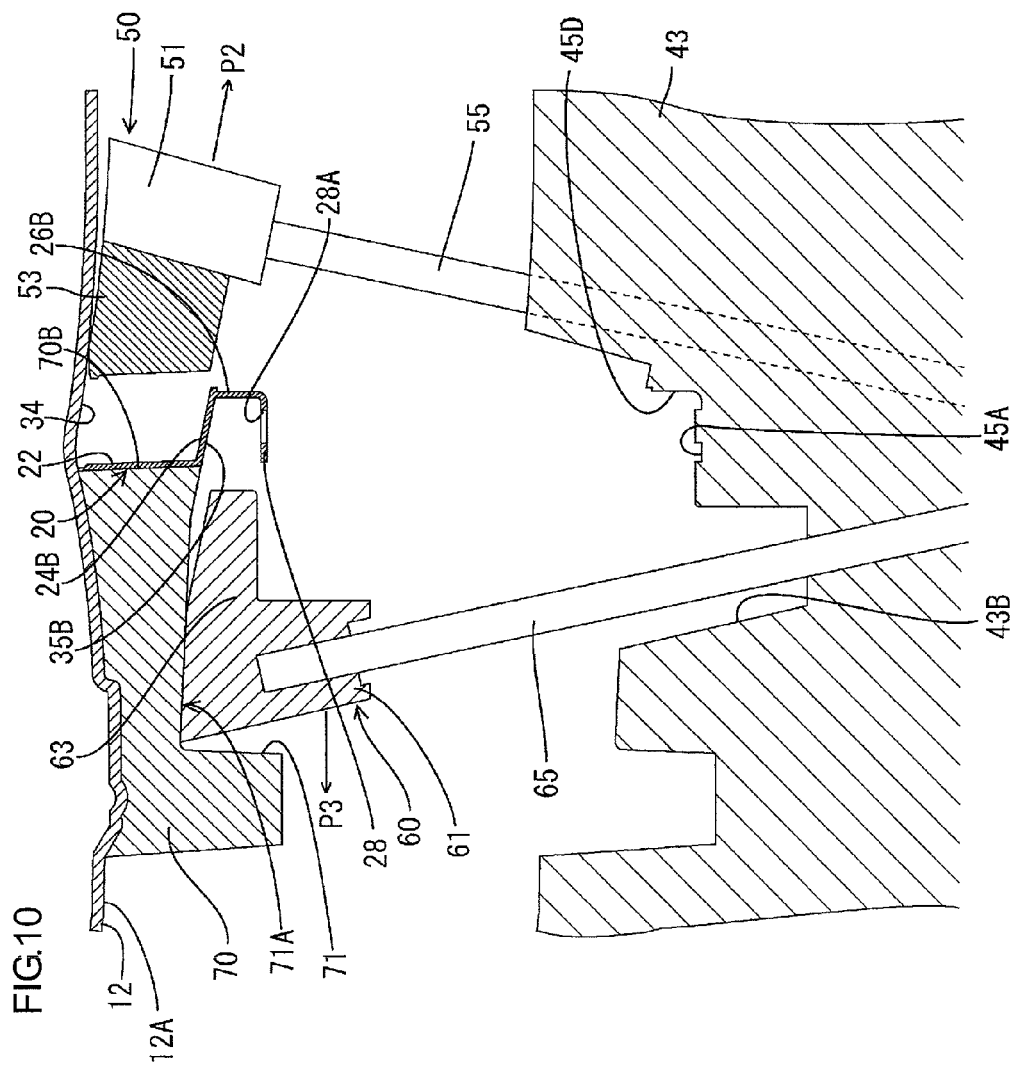
FIG. 10 shows a cross-sectional view illustrating the first die removal process and the second die removal process.

The side surface 70B of the core die 70 is in contact with the first perpendicular wall 22 at the completion of the first die removal process and the second die removal process (see FIG. 10). The first perpendicular wall 22 extends downward (toward the lower die 43) from the trim board 12 at an angle such that the first perpendicular wall 22 gradually separates from the core die 70 as a distance from the trim board 12 increases. When the trim board 12 is moved upward from the position illustrated in FIG. 10, the first perpendicular wall 22 is not caught by the core die 70.

Next, effects of the this embodiment will be described. In the clip mount forming process of this embodiment, the connecting wall 24B is formed such that the distance L2 between opposed surfaces of the trim board 12 and the connecting wall 24B does not vary for the entire space of the hollow portion 34B in the sliding direction of the first slide die 50 in the first die removal process. Furthermore, the connecting wall 24B is formed such that the distance L3 between opposed surfaces of the connecting wall 24B and the mount wall 28 increases in the sliding direction of the second slide die 60 in the second die removal process. The connecting wall 24A is formed in the same manner.

Because the connecting walls 24A and 24B are formed as described above, the projections 52 and 53 can be removed, without obstruction, from the hollow portions 34A and 34B, respectively, and the projections 62 and 63 can be removed, without obstruction, from the hollow portions 35A and 35B, respectively.

In this embodiment, the connecting walls 24A and 24B are formed as described above. Furthermore, the clip mounts 20A and 20B are formed using the first slide die 50 and the second slide die 60. Namely, angles of the connecting walls 24A and 24B are defined relative to the respective mount walls 28 and the trim board 12. Therefore, the first slide die 50 and the second slide die 60 can be removed without obstruction regardless of the surface shape of the trim board 12. According to this embodiment, high flexibility can be achieved in design of the clip mounts 20A and 20B.

The above effect of this embodiment will be described more in detail with reference to FIGS. 8 and 9. The portion of the trim board 12 in which the clip mounts 20A and 20B are formed slightly projects upward (toward the interior of the vehicle when the trim board 12 is installed in a vehicle) with the peak at the joint with the clip mounts 20A and 20B. The mount walls 28 are where the clips 18 are held. Therefore, the surfaces of the mount walls 28 and the surface of the door inner panel 11 need to be substantially parallel to one another.

The clip mounts 28 are substantially parallel to the surface of the door inner panel 11 and the trim board 12 slightly project toward the interior of the vehicle. Therefore, the distance between the back surface of the trim board 12 and an extended plane from the surfaces of the clip mounts 28 facing toward the back surface of the trim board 12 decreases as a distance from the clip mounts 28 on the extended plane increases. Namely, if the conventional slide die is used, the slide die cannot be removed after the clip mounts 28 are formed.

Angles of the opposed surfaces of the first slide die 50 and the second slide die 60 that define the connecting wall molding cavity S4 are defined such that the opposed surfaces are substantially parallel to the opposed surface of the trim board 12 to which the connecting wall 24B is to face. With the first slide die 50 and the second slide die 60, the connecting wall molding cavity S4 is defined such that the connecting wall molding cavity S4 declines as a distance from the first perpendicular wall molding cavity S2 increases. Angles of the opposed surfaces of the first slide die 50 and the second slide die 60 that define the other connecting wall molding cavity are also defined in the similar manner. Therefore, the connecting walls 24A and 24B formed in the connecting wall molding cavities defined by the first slide die 50 and the second slide die 60 are angled such that the distance between the connecting wall 24A and the trim board 12 and the distance between the connecting wall 24B and the trim board 12 are substantially constant for the entire space of the hollow portions 34A and 34B. With this configuration, even through the back surface of the trim board 12 declines toward the opening of the hollow portions 34A and 34B, the first slide die 50 can be slid without obstruction for removal.

Furthermore, the second slide die 60 is slid in the opposite direction to the sliding direction of the fire slide die 50 for removal. Because of the angles of the connecting walls 24A and 24B, the distance between the connecting wall 24A and the mount wall 28 of the clip mount 20A and the distance between the connecting wall 24B and the mount wall 28 of the clip mount 20B increase toward the openings of the hollow portions 35A and 35B. Therefore, the second slide die can be slid without obstruction for removal.

Each of the clip mounts 20A and 20B includes the mount wall 28 that is angled such that a distance from the door inner panel 11 decreases as the distance from the first perpendicular wall 22 measuring in the direction along the door inner panel 11 increases. In the clip mount forming process for forming such clip mount 20A and 20B, the clip mounts 20A and 20B are formed such that the hollow portions 34A and 35A open in the opposite directions (the removal direction of the first slide die 50 and the removal direction of the second slide die 60) and the hollow portions 34B and 35B open in the opposite directions (the removal direction of the first slide die 50 and the removal direction of the second slide die 60). Furthermore, the clip mounts 20A and 20B are formed such that the connecting walls 24A and 24B extend along the trim board 12.

The distance L3 between opposed surfaces of the connecting wall 24B and the mount wall 28 increases toward the opening of the hollow portion 35B. The distance between opposed surfaces of the connecting wall 24A and the mount wall 28 increases toward the opening of the hollow portion 35A. Therefore, the projections 62 and 63 can be removed from the hollow portions 35A and 35B, respectively, without obstruction. With the method of this embodiment, the clip mounts 20A and 20B can be formed in the portion of the trim board 12 which projects upward (or toward the interior of the vehicle). Such a portion of the trim board 12 is where it is usually difficult to form the clip mounts 20A and 20B.

Generally, a trim board such as the trim board 12 is curved, that is, a surface thereof has more complex shape in comparison to a flat board. If the trim board 12, more specifically, the clip mounts 20A and 20B are formed by a method using the conventional slide dies, removals of the dies are difficult. According to this embodiment, the clip mounts 20A and 20B can be properly and easily formed even though the trim board 12 has a complex surface shape.

The clip mounts 20A and 20B are arranged below an armrest 13. To form the clip mounts 20A and 20B in an area of the trim board 12 around which another member such as the armrest 13 is provided, a slide die cannot be moved toward the other part. Namely, the slide die needs to be moved to a direction different from the direction toward the other member and thus the removal direction of the slide die is limited. According to this embodiment, the first and second slide dies 50 and 60 can be removed without obstruction even though the trim board 12 has the surface in a complex shape. Therefore, the removal directions of the first and second slide dies 50 and 60 can be set with relative flexibility. Namely, the removal directions of the first and second slide dies 50 and 60 can be easily set to directions in which the armrest 13 is not arranged.

In the clip mount forming process, the first perpendicular wall molding cavity S2 for molding the first perpendicular wall 22 is defined by the projection 53 and the core die 70 arranged between the trim board 12 and the second slide die 60. In the second die removal process, the second slide die 60 is slid on the surface 71A of the core die 70 on the second slide die 60 side.

If the die set 40 is configured such that the second slide die 60 slides on the surface of the trim board 12, the surface shape of the trim board 12 affects the movement of the second slide die 60. If the surface of the trim board 12 is wavy (for example, if the surface includes a protrusion 12B that protrudes downward in FIG. 8), the second slide die 60 cannot slide on the surface of the trim board 12. In this embodiment, the core die 70 is arranged between the trim board 12 and the second slide die 60, and the second slide die 60 is configured to slide on the surface 71A of the core die 70. Therefore, the second slide die 60 can slide regardless of the surface shape of the trim board 12.

The sliding direction of the first slide die 50 in the first die removal process and that of the second slide die 60 in the second die removal process are opposite to each other along the exterior surface 12A of the trim board 12 on the vehicle exterior side.

If the sliding directions of the first and the second slide dies 50 and 60 are perpendicular to each other, driving devices for moving the first and the second slide dies 50 and 60 may approach each other. Namely, the driving devices are more likely to obstruct operations thereof each other. In this embodiment, the sliding directions of the first and the second slide dies 50 and 60 for removal are opposite to each other. Therefore, the driving devices are less likely to obstruct the operations thereof each other. Namely, driving mechanisms for sliding the first and the second slide dies 50 and 60 can be provided in simple configurations.

Figure 11:
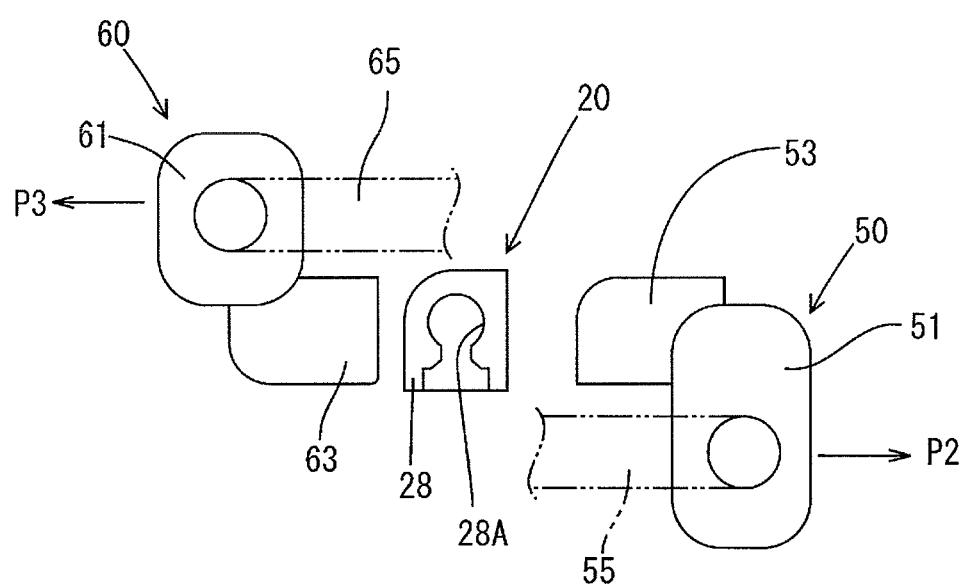
FIG. 11 shows a schematic view illustrating die removal directions in the first die removal process and the second die removal process.

The above effect of this embodiment will be described more in detail with reference to FIGS. 11 and 12. FIG. 11 is a schematic plan view of the first slide die 50 and the second slide die 60 configured to slide in a first direction P2 and a second direction P3, respectively. The first direction P2 and the second direction P3 are opposite to each other in the plan view. FIG. 12 illustrates a modification of this embodiment. In the modification, the first direction P2 in which the first slide die 50 slides and the second direction P3 in which the second slide die 60 slides are set at 90 degrees. Namely, the removal directions of the first slide die 50 and the second slide die 60 are perpendicular to each other.

In the configuration illustrated in FIG. 11, the longitudinal direction of the first rod 55 for moving the first slide die 50 (an example of a driving mechanism) and that of the second rod 65 for moving the second slide die 60 (an example of a driving mechanism) are substantially perpendicular to each other. When the first rod 55 and the second rod 65 are arranged such that they are not on the same line as illustrated in FIG. 11, the first rode 55 and the second rod 65 do not obstruct the operations thereof each other. Namely, the driving mechanisms for sliding the first and the second slide dies 50 and 60 can be provided in simple configurations.

In the configuration illustrated in FIG. 12, the longitudinal direction of the first rod 55 and that of the second rod 65 are substantially perpendicular to each other in the plan view. The driving mechanisms including the first and the second rods 55 and 65 and cylinders for moving the first and the second rods 55 and 65 need to be arranged with consideration so that the first and the second rods 55 and 65 do not obstruct the operations thereof each other. Although the sliding directions of the first and the second slide dies 50 and 60 are not limited to the opposite directions, it is preferable to set the sliding directions to the opposite directions.

Other Embodiments

The technology described herein is not limited to the embodiment explained in the above description and the drawings. The following embodiments may be included in the technical scope of the invention.

(1) The first die removal process and the second die removal process may be performed in sequence after the clip mount forming process.

(2) In the clip mount forming process, melted resin may be injected into the baseboard shaping cavity S1 and the clip mount molding space S to integrally form the trim board 12 and the clip mounts 20A and 20B. The materials of the trim board 12 and the clip mounts 20A and 20B may be altered as appropriate.

(3) The connecting wall 24B may be formed such that the distance L2 between the opposed surfaces of the trim board 12 and the connecting wall 24B increases as the distance from the first perpendicular wall 22B in the removal direction of the first slide die 50 increases. The connecting wall 24A may be formed in the same manner. Namely, the distance L2 may be set such that the projections 52 and 53 can be removed from the hollow portions 34A and 34B, respectively, without obstruction.

(4) The connecting wall 24B may be formed such that the distance L3 between the opposed surfaces of the connecting wall 24B and the mount wall 28 may be constant for the entire space of the hollow portion 35B. The connecting wall 24A may be formed in the same manner. Namely, the distance L3 may be set such that the projections 62 and 63 can be removed from the hollow portions 35A and 35B, respectively, without obstruction.

(5) The baseboard on which the clip mounts 20A and 20B is not limited to the trim board 12. A pillar garnish or a trunk trim may be another example of the baseboard that is fixed to the plate-shaped member with clips. The plate-shaped member to which the clips 18 are attached is not limited to the door inner panel 11. A synthetic resin baseboard may be another example of the plate-shaped member.

(6) The clip mounts 20A and 20B are not limited to the configurations in which the clip mounts 20A and 20B are joined. The clip mounts 20A and 20B may be separated from each other. The number and the locations of the clip mounts 20A and 20B can be altered as appropriate.

(7) The upper die 41 is not limited to the movable die configuration and the lower die 43 is not limited to the fixed die configuration. The moving direction of the movable die is not limited to the vertical direction. The fixed die and the movable die may be arranged in the horizontal direction.

(8) The configuration of the die set 40 is not limited to the above embodiment in which the projections 52 and 53 are removed from the hollow portions 34A and 34B, respectively, as the first slide die 50 moves upward. The die set 40 may be configured such that the projections 52 and 53 are removed from the hollow portions 34A and 34B, respectively, while the first slide die 50 stays still, that is, does not move upward. The second slide die 60 may be configured to move only in the removal direction.

(9) The core die 70 may not be included in the die set 40. If a portion of the trim board 12 which is in contact with the core die 70 is flat and parallel to the direction in which the mount walls 28 project from the second perpendicular walls 26A and 26B (as indicated with two-dot chain line 12D in FIG. 8), the core die 70 can slide on the exterior surface 12A of the trim board 12. Therefore, the core die 70 may be integrated into the second slide die 60, that is, the second slide die 60 and the core die 70 may be provided as a single slide die (without a core die). With the integrated second slide die 60 and the core die 70, the configuration of the die set 40 can be further simplified.

The invention claimed is:

1. A method of molding a clip mount on a baseboard, the clip mount being for holding a clip with which the baseboard is attached to a plate-shaped member, the method comprising:
    forming a clip mount forming space with a first slide die including a projection, a second slide die including a projection, and a base die including a recess in which the first slide die and the second slide die are placed, a first portion of the clip mount forming space being defined by a first surface of the projection of the first slide die and a surface of the second slide die opposite the first surface of the projection of the first slide die, a second portion of which being defined by a second surface of the projection of the first slide die continuing from the first surface thereof and a first surface of the projection of the second slide die opposite the second surface of the projection of the first slide die, a third portion of which being defined by a second surface of the projection of the second slide die continuing from the first surface thereof and a first surface of the base die opposite the second surface of the second slide die, and a fourth portion of which being defined by a third surface of the projection of the second slide die continuing from the second surface thereof and a second surface of the base die continuing from the first surface of the base die;
    injecting molten resin into the clip mount forming space;
    forming a first perpendicular wall in the first portion of the clip mount forming space so as to rise from an opposed surface of the baseboard that is to be arranged opposite the plate-shaped member when attached to the plate-shaped member;
    forming a connecting wall in the second portion of the clip mount forming space so as to extend from a distal end of the first perpendicular wall away from the baseboard such that a distance between the connecting wall and the opposed surface of the baseboard is one of constant and increased as a distance from the first perpendicular wall increases;
    forming a second perpendicular wall in the third portion of the clip mount forming space so as to rise from a distal end of the connecting wall away from the first perpendicular wall toward an opposite direction to the baseboard;
    forming a mount wall with a mounting hole in the fourth portion of the clip mount forming space so as to extend from an end of the second perpendicular wall away from the connecting wall such that a distance between the mount wall and the connecting wall is one of constant and increased as a distance from the second perpendicular wall increases;
    sliding the first slide die for removal from the formed clip mount; and
    sliding the second slide die in a different direction from a direction in which the first slide die is slid for removal from the formed clip mount.

2. The method according to claim 1, wherein
    the second slide die includes a slide die portion and a core die portion having a slide surface on which the slide die portion slides,
    the surface of the second slide die which defines the first portion of the clip mount forming space is a surface of the core die portion,
    the first surface, the second surface, and the third surface of the projection of the second slide die which define the second portion, the third portion, and the fourth portion of the clip mount forming space, respectively, are surfaces of the slide die portion,
    the sliding the first slide die includes sliding the first die along the opposed surface of the baseboard, and
    the sliding the second slide die includes sliding the slide die portion on the slide surface of the core die portion along the opposed surface of the baseboard.

3. The method according to claim 1, wherein the direction in which the second slide die is slid is an opposite direction from the direction in which the first slide die is slid.

4. The method according to claim 1, further comprising forming a baseboard forming space with the first slide die, the second slide die, the base die, and an additional die such that the baseboard forming space is communicated with the first portion of the clip mount forming space, wherein
    the injecting molten resin further including injecting the molten resin into the baseboard forming space.

5. The method according to claim 4, further comprising moving the additional die perpendicular to or substantially perpendicular to the direction in which the second slide die is slid, wherein
    the sliding the second slide die includes moving the second slide die at an angle between the directions in which the additional die is moved and the second slide die is slid, respectively, to slide the second slide die in the different direction from the direction in which the first slide die is slid.

6. The method according to claim 4, wherein
the forming the baseboard forming space includes forming a bend in a portion with which the first portion of the clip mount forming space is connected.

7. The method according to claim 1, further comprising:
forming a baseboard forming space with the first slide die, the second slide die, the base die, and another die; and
forming the baseboard in the baseboard forming space such that a portion of the opposed surface of the baseboard is concaved, wherein
the forming the clip mount forming space includes arranging the first portion of the clip mount forming space to connect with the portion of the opposed surface of the base board which is concaved.

* * * * *